United States Patent
Cornell et al.

(10) Patent No.: US 12,306,779 B2
(45) Date of Patent: May 20, 2025

(54) SYSTEMS AND METHODS FOR A SMART NAVIGATION TUNING PANEL

(71) Applicant: THE BOEING COMPANY, Arlington, VA (US)

(72) Inventors: Bradley D. Cornell, Moses Lake, WA (US); Jason Hammack, Seattle, WA (US); Katie Younkin, Medford, OR (US)

(73) Assignee: THE BOEING COMPANY, Arlington, VA (US)

( * ) Notice: Subject to any disclaimer, the term of this patent is extended or adjusted under 35 U.S.C. 154(b) by 76 days.

(21) Appl. No.: 18/318,471

(22) Filed: May 16, 2023

(65) Prior Publication Data
US 2024/0385980 A1    Nov. 21, 2024

(51) Int. Cl.
*G06F 13/36*    (2006.01)

(52) U.S. Cl.
CPC .......... *G06F 13/36* (2013.01); *G06F 2213/40* (2013.01)

(58) Field of Classification Search
CPC .............................. G06F 13/36; G06F 2213/40
See application file for complete search history.

(56) References Cited

U.S. PATENT DOCUMENTS

| | | |
|---|---|---|
| 5,184,312 A | 2/1993 | Ellis |
| 5,809,402 A | 9/1998 | Lemme |
| 8,019,338 B2 | 9/2011 | Malaga et al. |
| 8,081,933 B2 | 12/2011 | Malaga et al. |
| 9,159,241 B1 | 10/2015 | Murphy |
| 10,992,372 B2 | 4/2021 | Srinivasan et al. |
| 11,163,067 B2 | 11/2021 | Murphy et al. |
| 11,342,957 B2 | 5/2022 | Morowsky et al. |
| 2002/0009994 A1 | 1/2002 | Sample |

(Continued)

FOREIGN PATENT DOCUMENTS

| | | |
|---|---|---|
| CN | 103048984 B | 12/2013 |
| CN | 203433354 U | 2/2014 |

(Continued)

OTHER PUBLICATIONS

ABIM-429A ARINC-439 Bus Monitor, https://www.curtisswrightds.com/products/flight-test/data-acquisition/axon/adau/abim-429a, retrieved May 10, 2023, pp. 1-4.

(Continued)

*Primary Examiner* — Henry Tsai
*Assistant Examiner* — Aurangzeb Hassan
(74) *Attorney, Agent, or Firm* — Moore IP Law (57) ABSTRACT

A line-replaceable unit (LRU) for an aircraft includes an interface configured to couple to an aircraft data bus. The LRU further includes one or more processors coupled to the interface. The one or more processors are configured to monitor communications over the aircraft data bus between a pilot interface device and a second LRU. The LRU is distinct from the second LRU and is distinct from the pilot interface device. The one or more processors are further configured to, in response to detecting a particular page being transmitted over the aircraft data bus, extract target data associated with the particular page from the aircraft data bus. The one or more processors are further configured to store the target data at a memory associated with the one or more processors.

20 Claims, 7 Drawing Sheets

(56) References Cited

U.S. PATENT DOCUMENTS

| | | | | |
|---|---|---|---|---|
| 2016/0362093 | A1* | 12/2016 | Gadzinski | B64C 25/42 |
| 2018/0148192 | A1* | 5/2018 | Haskins | B64D 25/00 |
| 2019/0321981 | A1* | 10/2019 | Bosworth | B25J 9/04 |
| 2020/0184830 | A1* | 6/2020 | Samuthirapandian | B64D 45/00 |
| 2020/0380875 | A1* | 12/2020 | Letsu-Dake | G08G 5/065 |
| 2021/0311200 | A1* | 10/2021 | Murphy | G01S 19/15 |

FOREIGN PATENT DOCUMENTS

| | | | |
|---|---|---|---|
| CN | 204667662 U | 9/2015 | |
| CN | 107689895 A | 2/2018 | |
| CN | 110471880 A | 11/2019 | |
| FR | 2907997 B1 | 12/2008 | |

OTHER PUBLICATIONS

AERO No. 21—Global Navigation Satellite System, https://www.boeing.com/commercial/aeromagazine/aero_21/gnss_story.html, retrieved May 10, 2023, pp. 1-9.

BIM-429C 16 Channel ARINC-429 Bus, https://www.curtisswrightds.com/products/flight-test/data-acquisition/cdau-edau/bus/bim429c8, retrieved May 10, 2023, pp. 1-3.

Gables Engineering—Products, https://www.gableseng.com/products/, retrieved May 10, 2023, pp. 1-5.

Extended European Search Report for application No. 24165102.5 dated Sep. 17, 2024, pp. 1-8.

\* cited by examiner

SYSTEMS AND METHODS FOR A SMART NAVIGATION TUNING PANEL

FIELD OF THE DISCLOSURE

The present disclosure is generally related to systems and methods for a smart navigation tuning panel.

BACKGROUND

Legacy aircraft have well established operating procedures that many pilots have been trained on. Having a large pool of trained pilots can reduce operating costs and improve safety. Legacy aircraft may have design elements different than recently designed aircraft. For example, some legacy aircraft may require a pilot to manually enter an instrument landing system frequency that is displayed on a screen. Updating legacy designs may require altering operating procedures, which can be an expensive process and require re-training pilots in the new operating procedures, thereby reducing the pool of available pilots.

SUMMARY

In a particular implementation, a line-replaceable unit (LRU) for an aircraft includes an interface configured to couple to an aircraft data bus. The LRU further includes one or more processors coupled to the interface. The one or more processors are configured to monitor communications over the aircraft data bus between a pilot interface device and a second LRU. The LRU is distinct from the second LRU and is distinct from the pilot interface device. The one or more processors are further configured to, in response to detecting a particular page being transmitted over the aircraft data bus, extract target data associated with the particular page from the aircraft data bus. The one or more processors are further configured to store the target data at a memory associated with the one or more processors.

In another particular implementation, a method includes monitoring, at one or more processors of a first line-replaceable unit (LRU), communications over an aircraft data bus between a pilot interface device and a second LRU. The first LRU is distinct from the second LRU and is distinct from the pilot interface device. The method further includes, in response to detecting a particular page being transmitted over the aircraft data bus, extracting target data associated with the particular page from the aircraft data bus. The method further includes storing the target data at a memory associated with the one or more processors.

In another particular implementation, a computer-readable storage device stores instructions that are executable by one or more processors of a line-replaceable unit (LRU) to perform operations. The operations include monitoring communications over a data bus between an interface device and a second LRU. The first LRU is distinct from the second LRU and is distinct from the pilot interface device. The operations include, in response to detecting a particular page being transmitted over the data bus, extracting target data associated with the particular page from the data bus. The operations further include storing the target data at a memory.

The features, functions, and advantages described herein can be achieved independently in various implementations or may be combined in yet other implementations, further details of which can be found with reference to the following description and drawings.

DETAILED DESCRIPTION

Flight procedures for some legacy aircraft require a pilot to read a radio frequency from a Control Display Unit (CDU) and enter the frequency into a navigation (NAV) tuning panel. This requires a pilot to read the CDU and manually enter the frequency. Once the frequency has been entered, the pilot must verify the frequency before making it the active frequency. Systems disclosed herein enable the NAV tuning panel to monitor communications between the CDU and a flight management computer (e.g., a message sent from the flight management computer to the CDU to display the radio frequency to the pilot). In the disclosed systems, when particular messages are detected, a navigation frequency can be extracted from the message and used to automatically update a standby frequency of the NAV tuning panel. The pilot can then verify the radio frequency before making it the active frequency. Thus, the disclosed systems simplify the process of tuning to navigation radio frequencies in a manner that reduces pilot workload and reduces the possibility of incorrect data entry. By making the NAV tuning panel preload the frequency displayed on the CDU, the pilot can save time and reduce errors by not needing to manually enter the frequency. The flight procedures do not need to be changed as they still require pilot verification and input.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1:
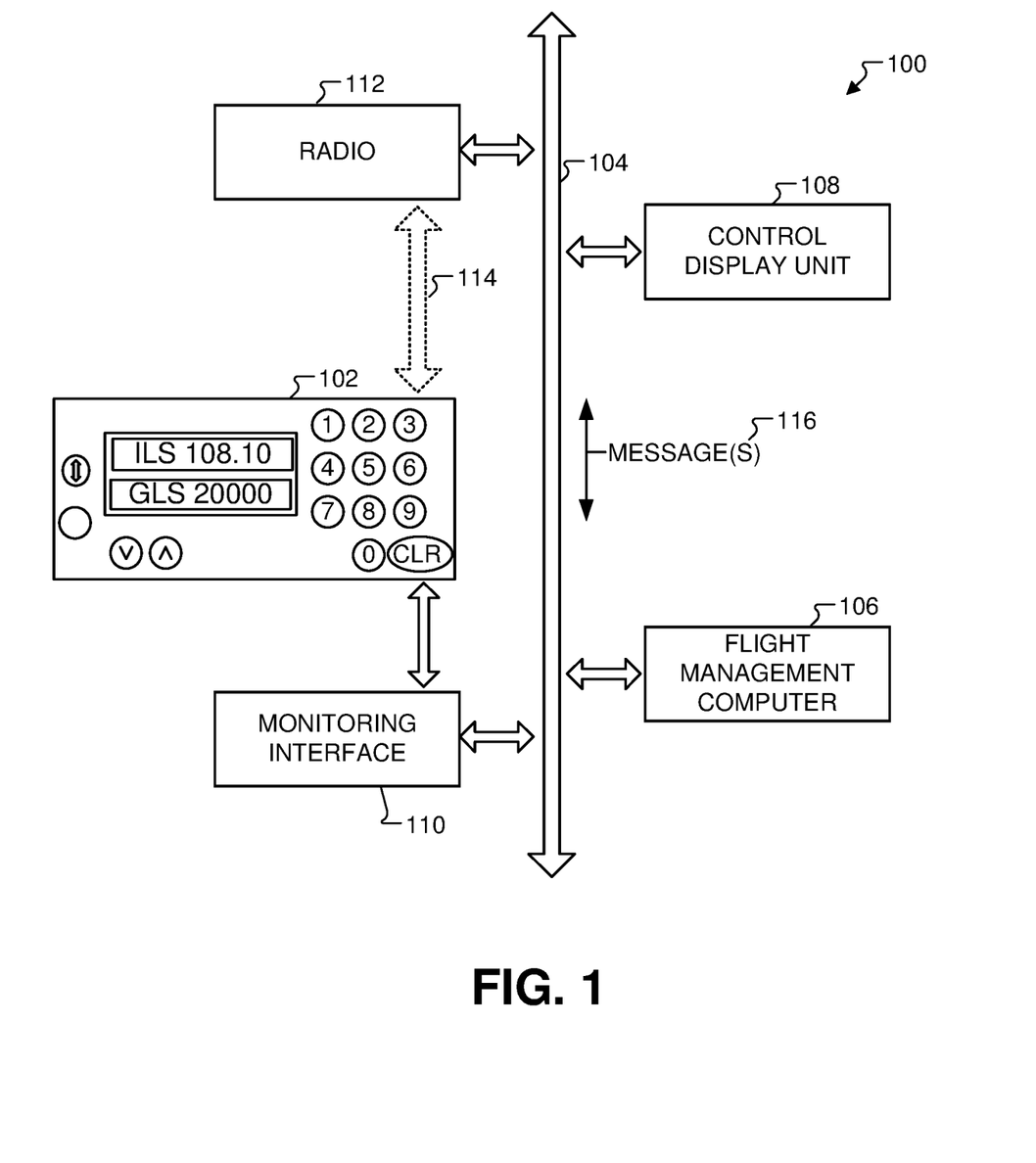
FIG. 1 is a diagram that illustrates aircraft systems including an automated tuning panel.

Referring to FIG. 1, a diagram 100 of an aircraft system with an automated tuning panel 102 is shown. The aircraft system includes an aircraft data bus 104. A flight management computer (FMC) 106 communicates with a control display unit (CDU) 108 by transmitting message(s) 116 along the aircraft data bus 104. The FMC 106 may include a navigation database that provides information about airports, routes, or a combination thereof. The FMC 106 may also be configured to identify an aircraft's current position, determine speeds for an autopilot, or a combination thereof. The CDU 108 may be configured to display pages of data provided by the FMC 106 via the message(s) 116. The CDU 108 may also include an input that enables a pilot to input data or send requests for specific data to the FMC 106 via the message(s) 116. The automated tuning panel 102, the FMC 106, and the CDU 108 may each be a line-replaceable unit (LRU).

The automated tuning panel 102 includes a monitoring interface 110 that is configured to couple the automated tuning panel 102 to the aircraft data bus 104. The monitoring interface 110 is configured to monitor the message(s) 116 transmitted along the aircraft data bus 104. The automated tuning panel 102 may correspond to a navigation (NAV) radio tuning panel.

When the automated tuning panel 102 detects a particular page in the message(s) 116 via the monitoring interface 110, the automated tuning panel 102 is configured to store target data from the particular page at a memory. The automated tuning panel may compare the target data to data already stored in the memory. The automated tuning panel may only store the target data into memory responsive to the target data being distinct from the data already stored in memory. The memory that the automated tuning panel 102 stores the target data in may be a standby memory like standby memory 212 of FIGS. 2A and 2B. The target data may include a particular radio frequency. For example, the particular page may be an approach page labeled with the string "approach ref" and the target data may be an instrument landing system (ILS) frequency on the approach page. Alternatively, the target data may be any frequency that can be processed by the automated tuning panel such as a ground-based augmentation landing system (GLS) frequency, a very high frequency omni-directional range (VOR) frequency, a distance measuring equipment (DME) frequency, or a microwave landing system (MLS) frequency. The particular page may be any page that includes a frequency that would be desired by a pilot.

In some embodiments, the automated tuning panel 102 may be configured to change the frequency stored in memory to a frequency not specifically identified in a second page. For example, the monitoring interface 110 may detect that a second particular page is being transmitted via the message(s) 116. The second particular page may indicate that the aircraft is performing or subject to a required navigation performance (RNP) approach. During an RNP approach, an aircraft is expected to tune to a VOR frequency to receive proper navigation assistance. Upon detecting that a VOR frequency is to be used, the automated tuning panel 102 may store a VOR frequency into the standby memory for pilot verification before tuning. The VOR frequency may be a predetermined VOR frequency stored in the memory or it may be a VOR frequency determined via random number generation or any other means of number generation.

The automated tuning panel 102 may include inputs (e.g., the buttons illustrated in FIG. 1) that enable the pilot to enter a frequency into the standby memory. Additionally, the automated tuning panel may include a button that enables a pilot to swap a frequency stored in the standby memory with a frequency stored in an active memory. The active memory stores a frequency that a radio 112 is currently tuned to. Pressing the button to swap the two frequencies may result in a message being sent to an aircraft control system via the aircraft data bus 104. The aircraft control system may include the radio 112. Alternatively, the automated tuning panel may have a direct connection 114 with the radio 112, and the automated tuning panel 102 may transmit a message to the radio 112 via the direct connection. The standby frequency may not be transferred to the radio prior to the button being pressed.

By having the automated tuning panel 102 require the pilot to verify the frequency before sending the frequency to the radio, operating procedures can remain the same. Additionally, by auto populating the standby memory, errors in data entry can be reduced while also saving pilots time during important procedures such as an arrival procedure.

Figure 2A:
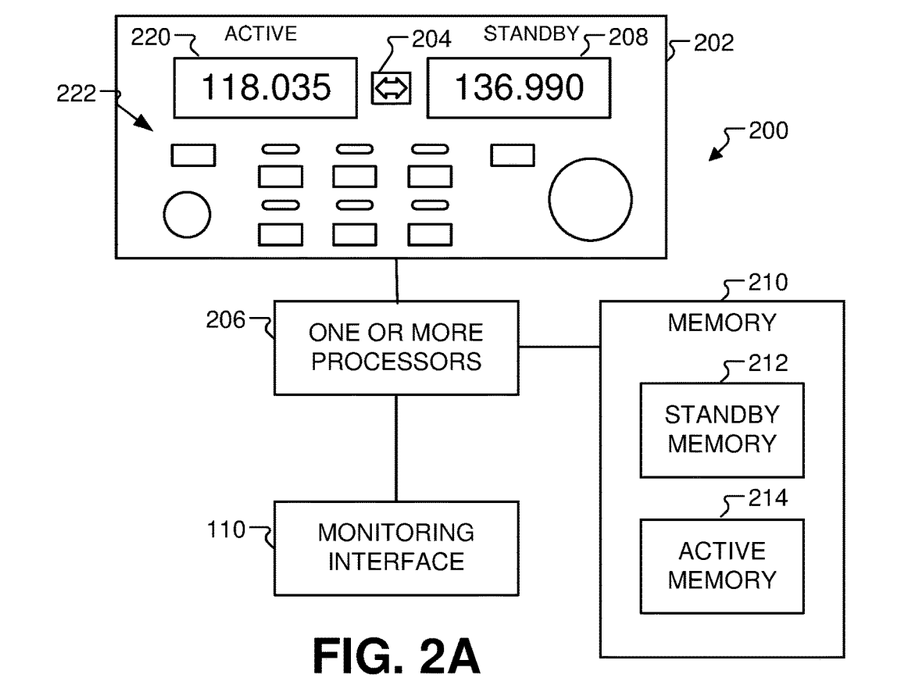
FIG. 2A is a diagram that illustrates an automated tuning panel system.

Referring to FIG. 2A, a diagram of an automated tuning panel system 200 is shown. The automated tuning panel system 200 may include an automated tuning panel 202. The automated tuning panel system 200 may further include one or more processors 206, the monitoring interface 110 of FIG. 1, one or more user input device(s) 222 (including, for example, button 204 and/or one or more other buttons, knobs, switches, etc.), and a memory 210. The automated tuning panel system 200 is one example of automated tuning panel 102 as illustrated and described with reference to FIG. 1.

The automated tuning panel 202 includes a display 220 for an active frequency of the radio 112 of FIG. 1 and a display 208 for a standby frequency. A pilot can adjust the active frequency or the standby frequency using the user interface device(s) 222. The active frequency may be stored in an active memory 214 of the memory 210. The standby frequency may be stored in a standby memory 212 of the memory 210. The standby memory 212 and active memory 214 may be two locations in memory that are identified as either active or standby based on the value of a register. Alternatively, the active memory and standby memories may be two separate memory devices that are part of memory 210 or two different sections of a single memory device that is part of memory 210. The memory 210 may also store instructions configured to be executed by the one or more processors 206.

In FIG. 2A, the active frequency is shown to be 118.035 on display 220 and the standby frequency is shown to be 136.990 on the display 208. Accordingly, if the monitoring interface 110 detected a particular page, the one or more processors 206 would overwrite the 136.990 frequency with the target data.

User input via a user input device, such as the button 204, instructs the one or more processors 206 to swap the frequency stored in active memory with the frequency stored in standby memory. Swapping the frequencies may be achieved by overwriting the frequencies in their current locations in memory, writing the frequencies to new locations in memory and changing pointers to point to the new locations, changing pointers in memory, or changing a value of a flag that identifies which memory location is standby and which is active.

Figure 2B:
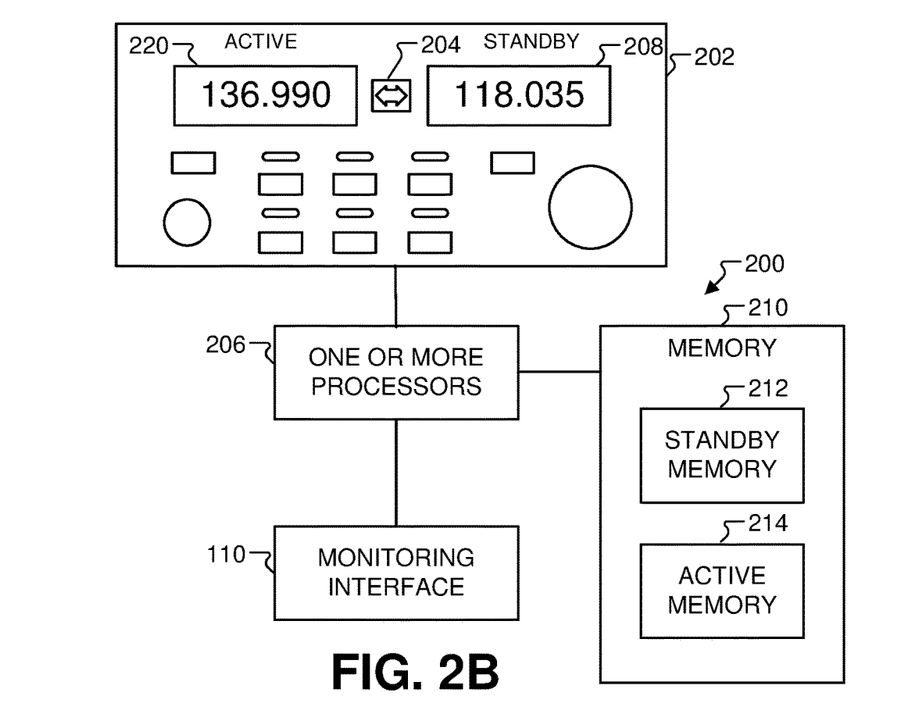
FIG. 2B is a diagram that illustrates an automated tuning panel system.

Referring to FIG. 2B, a diagram of the automated tuning panel system 200 is shown. In FIG. 2B, the button 204 has been pressed. Accordingly, the frequency 118.035 has been moved from being the active frequency to the standby frequency and is presented via the display 220, and the frequency 136.990 has been moved from being the standby frequency to the active frequency and is presented via the display 208. If the monitoring interface 110 detected a communication of relevant data over the aircraft data bus 104 (e.g., a page that included navigation radio data), the one or more processors 206 would overwrite the 118.035 frequency with the target data from the bus.

Figure 3:
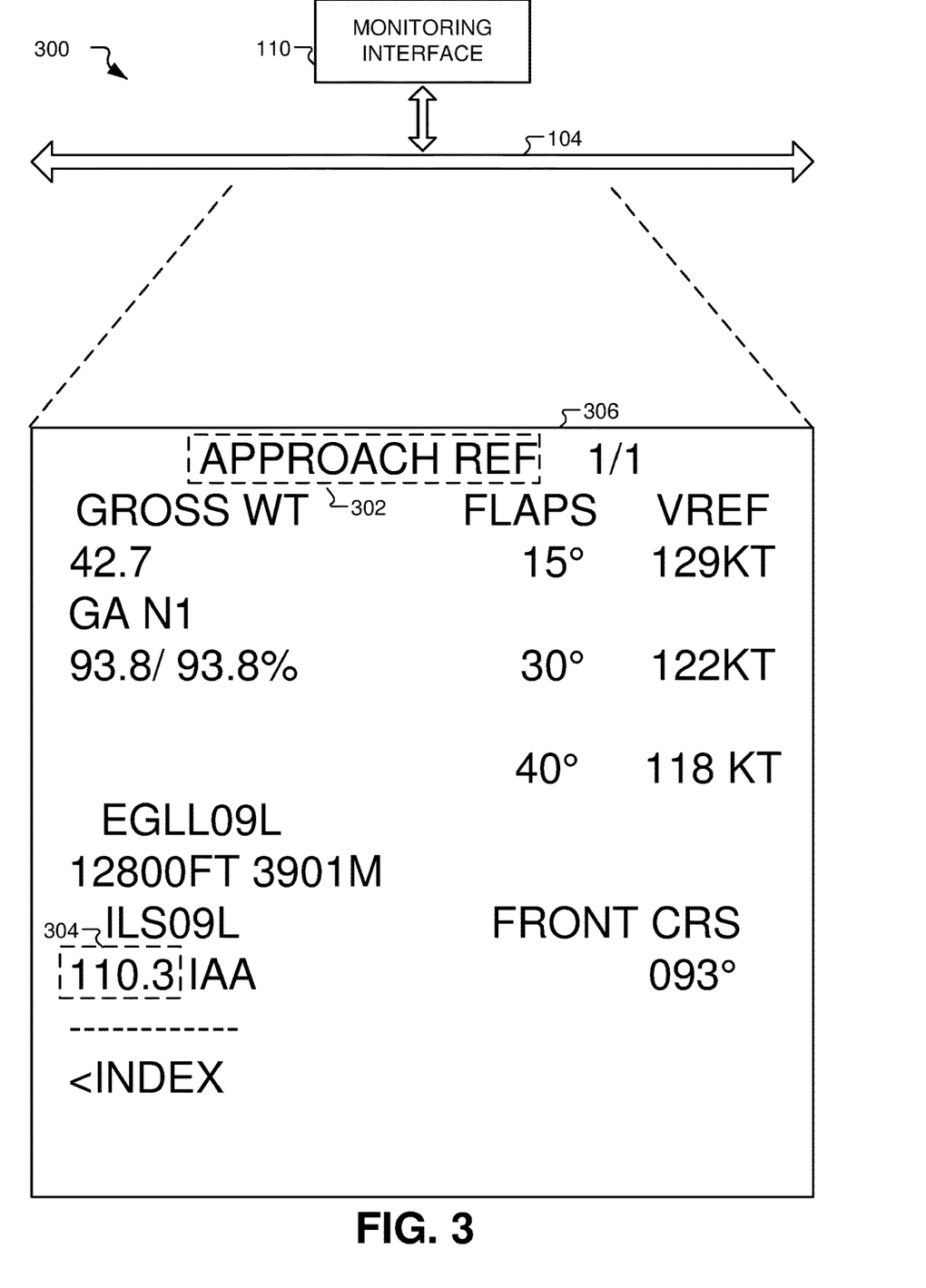
FIG. 3 is a diagram that illustrates a message being monitored by an automated tuning panel system.

Referring to FIG. 3, a diagram 300 of an approach reference page 306 being monitored by the monitoring interface 110 is shown. The page includes a specified string 302 and target data 304. The monitoring interface 110 of FIGS. 1, 2A, and 2B may monitor the aircraft data bus 104 of FIG. 1 for a page containing the specified string 302. In FIG. 3 the specified string 302 is "approach ref." In alternate embodiments, the specified string could correspond to any string that appears on a page containing a desired frequency.

Upon detecting a message containing the specified string 302, the one or more processors 206 of FIGS. 2A and 2B may process the page to identify target data 304. In one embodiment, the one or more processors 206 may search for content of a data field with a predetermined offset to the specified string 302. Alternatively, the one or more processors 206 may search for a specific string that occurs before the target data 304. For example, the one or more processors may search for the string "Front CRS" that occurs before the target data 304. Any other search method may be used to identify the target data 304.

Figure 4:
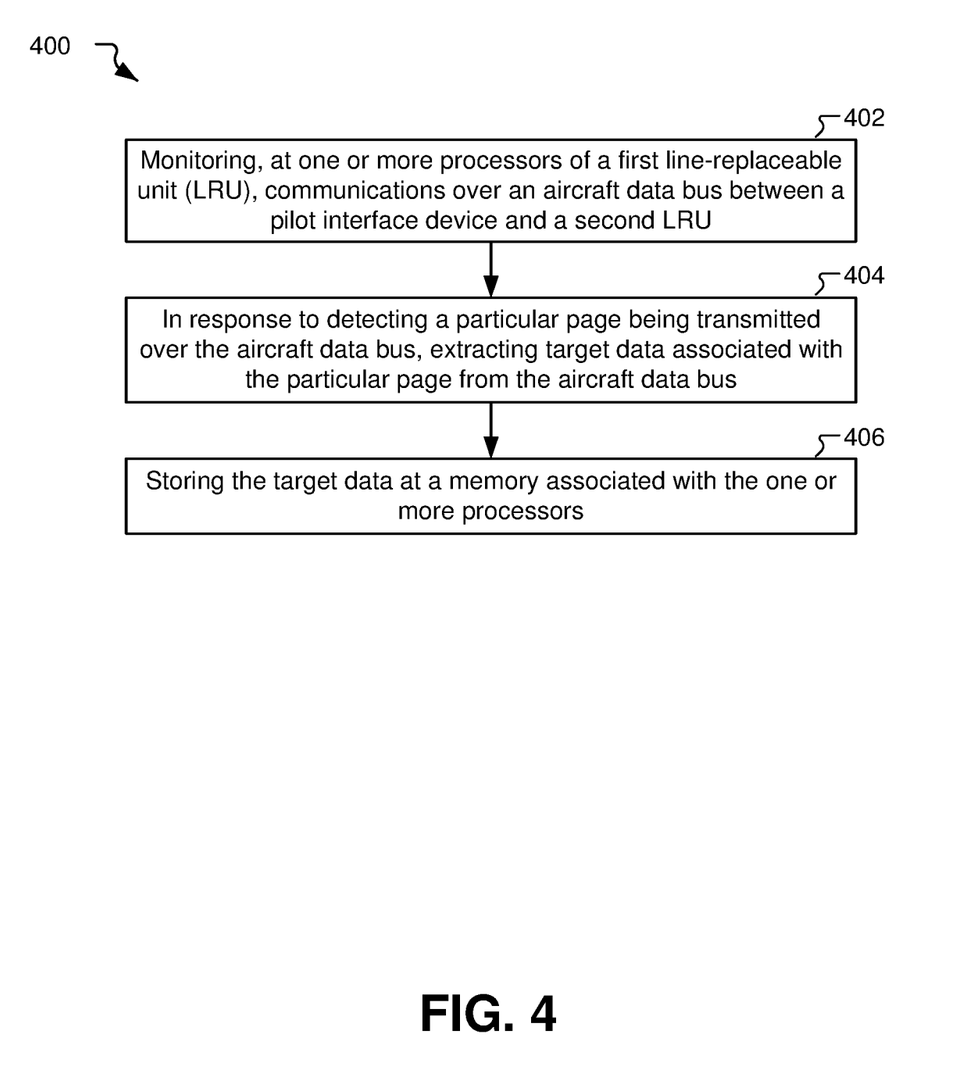
FIG. 4 is a flow chart of an example of a method of automated tuning.

Referring to FIG. 4, a particular illustrative example of a method is depicted and generally designated 400. In a particular implementation, operations of the method 400 are initiated, performed, or controlled by a processor, such as by one or more processors 206 of FIGS. 2A and 2B executing instructions.

The method 400 includes monitoring, at block 402, at one or more processors of a first line-replaceable unit (LRU), communications over an aircraft data bus between a pilot interface device and a second LRU. For example, the automated tuning panel 102 of FIG. 1 or the automated tuning panel system 200 of FIGS. 2A and 2B may monitor the aircraft data bus 104 for the message(s) 116 between the FMC 106 and the CDU 108. The automated tuning panel 102 or the automated tuning panel system 200 may monitor for messages containing specific data, a specific header, a specific sending device, a specific recipient device, or any other message attributes that assists in identifying a particular message.

The method 400 includes, in response to detecting a particular page being transmitted over the aircraft data bus, extracting, at block 404, target data associated with the particular page from the aircraft data bus. For example, the particular page may be an approach ref page like the approach ref page 306 of FIG. 3 or any other page of data that contains a relevant frequency. The particular page may be detected based on the page including text labeling it as an "approach ref" page such as the specified string 302, the page containing specific data, a specific target address, a specific sending address, or any other message attribute that assists in identifying the particular page. The target data may be a particular frequency like the target data 304 of FIG. 3 or any other data contained in the particular page.

The method 400 includes storing, at block 406, the target data at a memory associated with the one or more processors. For example, the memory may be the memory 210 or the standby memory 212 of FIGS. 2A and 2B.

Figure 5:
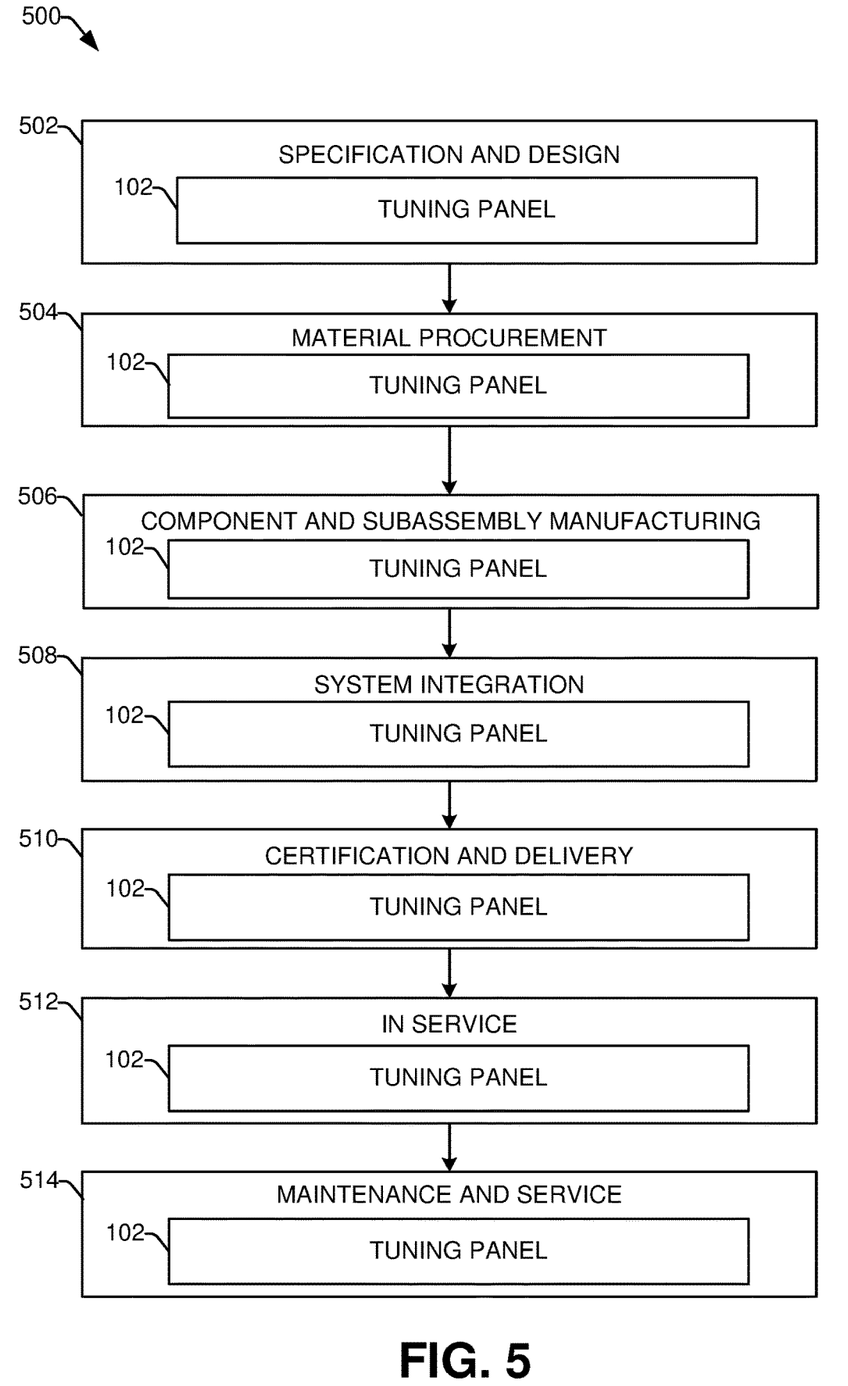
FIG. 5 is a flowchart illustrating a life cycle of an aircraft that includes an automated tuning panel.

Referring to FIG. 5, a flowchart illustrative of a life cycle of an aircraft that includes the automated tuning panel 102 is shown and designated 500. During pre-production, the exemplary life cycle 500 includes, at 502, specification and design of an aircraft, such as the aircraft 600 described with reference to FIG. 6. During specification and design of the aircraft, the life cycle 500 may include specification and design of the automated tuning panel 102. At 504, the life cycle 500 includes material procurement, which may include procuring materials for the automated tuning panel 102.

During production, the life cycle 500 includes, at 506, component and subassembly manufacturing and, at 508, system integration of the aircraft. For example, the life cycle 500 may include component and subassembly manufacturing of the automated tuning panel 102 and system integration of the automated tuning panel 102. At 510, the life cycle 500 includes certification and delivery of the aircraft and, at 512, placing the aircraft in service. Certification and delivery may include certification of the automated tuning panel 102 to place the automated tuning panel 102 in service. While in service by a customer, the aircraft may be scheduled for routine maintenance and service (which may also include modification, reconfiguration, refurbishment, and so on). At 514, the life cycle 500 includes performing maintenance and service on the aircraft, which may include performing maintenance and service on the automated tuning panel 102.

Each of the processes of the life cycle 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 6:
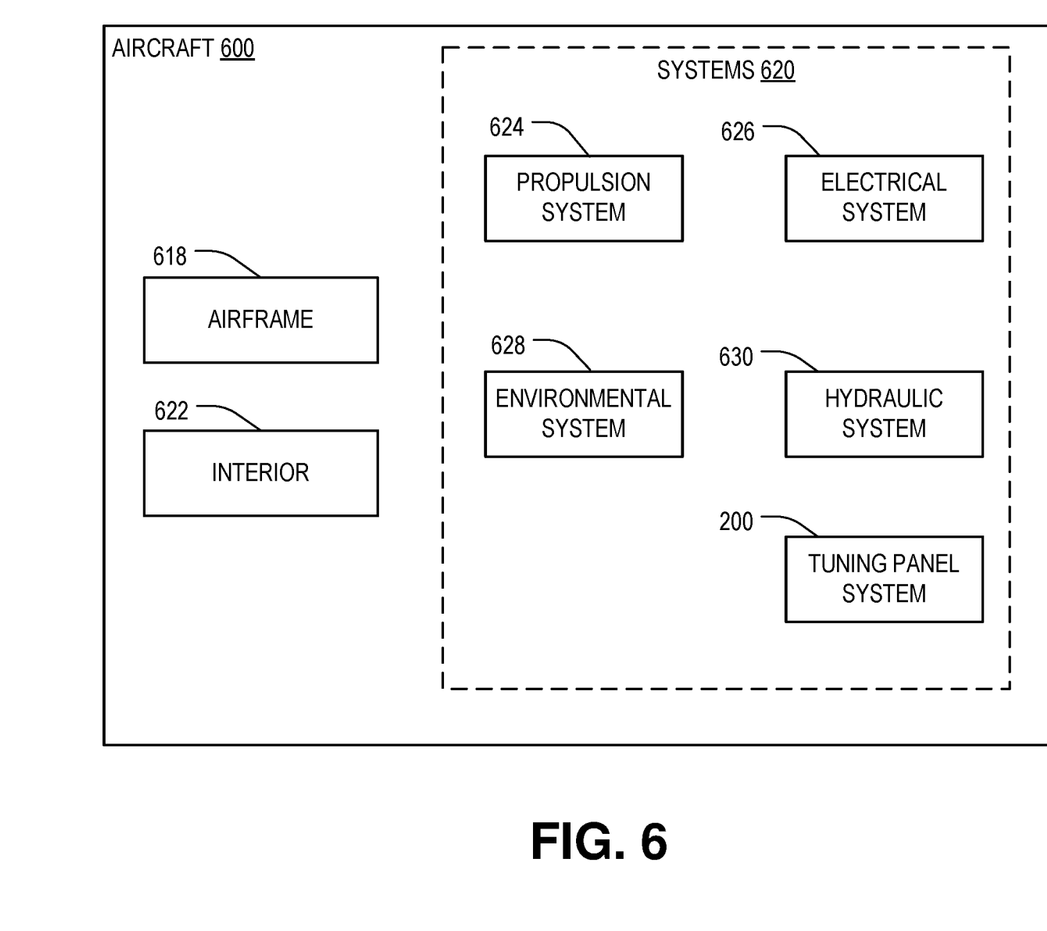
FIG. 6 is a block diagram of an aircraft that includes an automated tuning panel system.

Aspects of the disclosure may be described in the context of an aircraft 600 as shown in FIG. 6. The aircraft 600 includes an airframe 618 with a plurality of systems 620 (e.g., high-level systems) and an interior 622. Examples of the systems 620 include one or more of a propulsion system 624, an electrical system 626, an environmental system 628, a hydraulic system 630, and the tuning panel system 200. Other systems can also be included.

The tuning panel system 200 is configured to support aspects of computer-implemented methods and computer-executable program instructions (or code) according to the present disclosure. For example, the tuning panel system 200 is configured to execute instructions to initiate, perform, or control one or more operations described with reference to FIGS. 1-4.

Figure 7:
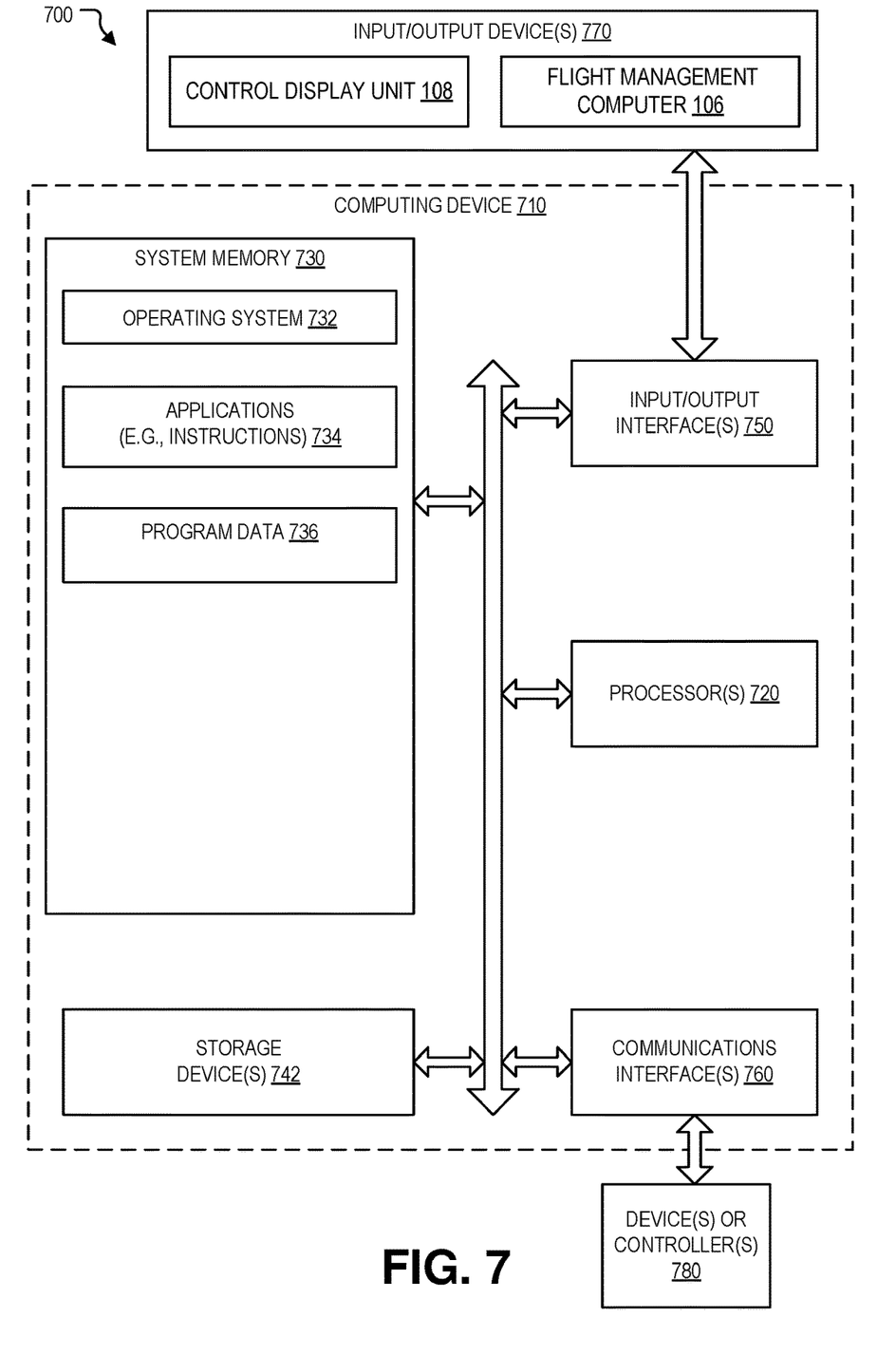
FIG. 7 is a block diagram of a computing environment configured to support aspects of automated tuning methods and computer-executable program instructions (or code) according to the present disclosure.

FIG. 7 is an illustration of a block diagram of a computing environment 700 including a computing device 710. The computing device 710 is configured to support embodiments of computer-implemented methods and computer-executable program instructions (or code) according to the present disclosure. In some examples, the computing device 710, or portions thereof, executes instructions to initiate, perform, or control operations described herein. To illustrate, the computing device 710 may include, correspond to, or be included within the automated tuning panel 102 of any FIG. 1 or the tuning panel system 200 of FIGS. 2A and 2B.

The computing device 710 includes one or more processors 720. The one or more processors 720 are configured to communicate with a system memory 730, one or more storage devices 742, one or more input/output interfaces 750, one or more communications interface(s) 760, or a combination thereof.

Depending on the particular implementation, the system memory 730 includes volatile memory devices (e.g., random access memory (RAM) devices), nonvolatile memory devices (e.g., read-only memory (ROM) devices, programmable read-only memory, or flash memory), one or more other memory devices, or a combination thereof. In FIG. 7, the system memory 730 stores an operating system 732, which can include a basic input/output system for booting the computing device 710 as well as a full operating system to enable the computing device 710 to interact with users, other programs, and other devices. The particular example of FIG. 7 also depicts that the system memory 730 stores one or more applications 734 executable by the one or more processors 720. In some examples, the one or more applications 734 include instructions executable by the one or more processors 720 to transmit signals between components of the computing device 710, such as the system memory 730, the one or more storage devices 742, the one or more input/output interfaces 750, the one or more communications interface(s) 760, or a combination thereof. The particular example of FIG. 7 also depicts that the system memory 730 (e.g., one or more memory devices) stores program data 736. Program data 736 may include any data necessary for operation of the one or more application 734.

In some implementations, the one or more storage devices 742 include nonvolatile storage devices, such as magnetic disks, optical disks, or flash memory devices. In some examples, the one or more storage devices 742 include removable memory devices, non-removable memory devices or both. In some cases, the one or more storage devices 742 are configured to store an operating system, images of operating systems, applications, and program data. In a particular example, the system memory 730, the one or more storage devices 742, or both, include tangible computer-readable media. As use herein, a storage device (e.g., the storage device 742) is a hardware device, and is not merely a signal.

In the example of FIG. 7, the one or more processors 720 are configured to communicate with the one or more input/output interfaces 750 to enable the computing device 710 to communicate with one or more input/output devices 770 to facilitate user interaction. In some implementations, the one or more input/output interfaces 750 include serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 770 include keyboards, pointing devices, displays, speakers, microphones, touch screens, one or more other devices, or a combination thereof. In some examples, the one or more processors 720 are configured to detect interaction events based on user input received via the one or more input/output interfaces 750. The one or more input/output devices 770 may include the control display unit 108 or the FMC 106. For example, the one or more input/output interfaces 750 may include interfaces that connect the computing device 710 to the aircraft data bus 104.

In a particular example, the one or more processors 720 are configured to communicate with (or send signals to) one or more devices 780 using the one or more communications interface(s) 760. In some implementations, the communications interface(s) 760 include one or more wired interfaces (e.g., Ethernet interfaces), one or more wireless interfaces that comply with an IEEE 802.11 communication protocol, one or more other wireless interfaces, one or more optical interfaces, one or more other network interfaces, or a combination thereof. In some examples, the one or more devices 780 include host computers, servers, workstations, line replaceable units of an aircraft, one or more other computing devices, or a combination thereof.

Although one or more of FIGS. 1-7 illustrate systems, apparatuses, and/or methods according to the teachings of the disclosure, the disclosure is not limited to these illustrated systems, apparatuses, and/or methods. One or more functions or components of any of FIGS. 1-7 as illustrated or described herein may be combined with one or more other portions of another of FIGS. 1-7. For example, one or more elements of the method 400 of FIG. 4 may be performed in combination with other operations described herein. Accordingly, no single implementation described herein should be construed as limiting and implementations of the disclosure may be suitably combined without departing from the teachings of the disclosure. As an example, one or more operations described with reference to FIGS. 1-7 may be optional, may be performed at least partially concurrently, and/or may be performed in a different order than shown or described.

Aspects of the disclosure are described further with reference to the following set of interrelated clauses:

Clause 1 includes a line-replaceable unit (LRU) for an aircraft, the LRU comprising: an interface configured to couple to an aircraft data bus; one or more processors coupled to the interface and configured to: monitor communications over the aircraft data bus between a pilot interface device and a second LRU, wherein the LRU is distinct from the second LRU and is distinct from the pilot interface device; in response to detecting a particular page being transmitted over the aircraft data bus, extract target data associated with the particular page from the aircraft data bus; and store the target data at a memory associated with the one or more processors.

Clause 2 includes the LRU of Clause 1 further comprising a user interface, wherein the one or more processors are further configured to transmit the target data from the memory to an aircraft control system responsive to receiving user input from the user interface.

Clause 3 includes the LRU of Clause 2 wherein the aircraft control system includes a radio tuning device configured to tune a radio to a particular radio frequency identified in the target data.

Clause 4 includes the LRU of any of Clause 1 to 3 wherein the one or more processors correspond to a navigation (NAV) radio tuning panel.

Clause 5 includes the LRU of any of Clause 1 to 4 wherein the pilot interface device comprises a control display unit (CDU).

Clause 6 includes the LRU of any of Clause 1 to 5 wherein the second LRU comprises a flight management computer (FMC).

Clause 7 includes the LRU of any of Clause 1 to 6 further comprising a display device configured to output data stored in the memory.

Clause 8 includes a method including monitoring, at one or more processors of a first line-replaceable unit (LRU), communications over an aircraft data bus between a pilot interface device and a second LRU, wherein the first LRU is distinct from the second LRU and is distinct from the pilot interface device; in response to detecting a particular page being transmitted over the aircraft data bus, extracting target data associated with the particular page from the aircraft data bus; and storing the target data at a memory associated with the one or more processors.

Clause 9 includes the method of Clause 8 further comprising comparing the target data to stored data stored at the memory, wherein the target data is stored at the memory responsive to the target data being distinct from the stored data.

Clause 10 includes the method of any of Clause 8 to 9 wherein the particular page corresponds to an approach page.

Clause 11 includes the method of any of Clause 8 to 10 further comprising comparing monitored data communicated on the aircraft data bus to detect a specified string, wherein the particular page is detected responsive to the specified string being detected.

Clause 12 includes the method of Clause 11 wherein the specified string includes "approach ref."

Clause 13 includes the method of any of Clause 11 to 12 wherein the target data corresponds to content of a data field having a predetermined offset to the specified string.

Clause 14 includes the method of any of Clause 8 to 13 wherein the target data corresponds to an instrument landing system (ILS) frequency.

Clause 15 includes the method of any of Clause 8 to 13 wherein the target data corresponds to a ground-based augmentation system (GBAS) landing system frequency.

Clause 16 includes the method of any of Clause 8 to 15 wherein the target data is stored in memory as a standby radio frequency, and further comprising transmitting the standby radio frequency from the memory to a radio tuning device responsive to receiving user input from a user interface, wherein the standby radio frequency is not transmitted to the radio tuning device prior to receiving the user input.

Clause 17 includes the method of Clause 16 wherein the memory identifies an active radio frequency, and wherein the active radio frequency is stored as a second standby radio frequency and the standby radio frequency is stored as a second active radio frequency responsive to the user input.

Clause 18 includes a computer-readable storage device storing instructions that, when executed by one or more processors of a line-replaceable unit (LRU), cause the one or more processors to: monitor communications over a data bus between an interface device and a second LRU, wherein the LRU is distinct from the second LRU and is distinct from the interface device; in response to detecting a particular page being transmitted over the data bus, extracting target data associated with the particular page from the data bus; and storing the target data at a memory.

Clause 19 includes the computer-readable storage device of Clause 18 wherein the instructions further cause the one or more processors to compare the target data to standby frequency data stored at the memory, and wherein the target data is stored at the memory responsive to the target data being distinct from the stored data.

Clause 20 includes the computer-readable storage device of any of Clause 18 to 20 wherein the particular page corresponds to an approach page.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A line-replaceable unit (LRU) for an aircraft, the LRU comprising:
    an interface configured to couple to an aircraft data bus;
    one or more processors coupled to the interface and configured to:
        monitor communications over the aircraft data bus between a pilot interface device and a second LRU, wherein the LRU is distinct from the second LRU and is distinct from the pilot interface device;
        in response to detection of a particular page being transmitted over the aircraft data bus, extract target data associated with the particular page from the aircraft data bus, wherein the particular page corresponds to a display page to be displayed via the pilot interface device, and wherein extraction of the target data includes conversion of particular text to be displayed on the display page to a particular aircraft system control parameter; and
        store the target data at a memory associated with the one or more processors.

2. The LRU of claim 1, further comprising a user interface, wherein the one or more processors are further configured to transmit the target data from the memory to an aircraft control system responsive to receiving user input from the user interface.

3. The LRU of claim 2, wherein the aircraft control system includes a radio tuning device configured to tune a radio to a particular radio frequency identified in the target data.

4. The LRU of claim 1, wherein the one or more processors are integrated within a navigation (NAV) radio tuning panel.

5. The LRU of claim 1, wherein the pilot interface device comprises a control display unit (CDU).

6. The LRU of claim 1, wherein the second LRU comprises a flight management computer (FMC).

7. The LRU of claim 1, further comprising a display device configured to output data stored in the memory.

8. A method comprising:
monitoring, at one or more processors of a first line-replaceable unit (LRU), communications over an aircraft data bus between a pilot interface device and a second LRU, wherein the first LRU is distinct from the second LRU and is distinct from the pilot interface device;
in response to detecting a particular page being transmitted over the aircraft data bus, extracting target data associated with the particular page from the aircraft data bus, wherein the particular page corresponds to a display page to be displayed via the pilot interface device, and wherein the extracting the target data includes converting particular text to be displayed on the display page to a particular aircraft system control parameter; and
storing the target data at a memory associated with the one or more processors.

9. The method of claim 8, further comprising comparing the target data to stored data stored at the memory, wherein the target data is stored at the memory responsive to the target data being distinct from the stored data.

10. The method of claim 8, wherein the particular page corresponds to an approach reference page.

11. The method of claim 8, further comprising comparing monitored data communicated on the aircraft data bus to a specified string, wherein the particular page is detected responsive to the specified string being detected.

12. The method of claim 11, wherein the specified string includes "approach ref".

13. The method of claim 11, wherein the target data corresponds to content of a data field having a predetermined offset to the specified string.

14. The method of claim 8, wherein the target data corresponds to an instrument landing system (ILS) frequency.

15. The method of claim 8, wherein the target data corresponds to a ground-based augmentation system landing system (GLS) frequency.

16. The method of claim 8, wherein the target data is stored in memory as a standby radio frequency, and further comprising transmitting the standby radio frequency from the memory to a radio tuning device responsive to receiving user input from a user interface, wherein the standby radio frequency is not transmitted to the radio tuning device prior to receiving the user input.

17. The method of claim 16, wherein the memory identifies an active radio frequency, and wherein the active radio frequency is stored as a second standby radio frequency and the standby radio frequency is stored as a second active radio frequency responsive to the user input.

18. A computer-readable storage device storing instructions that, when executed by one or more processors of a line-replaceable unit (LRU), cause the one or more processors to:
monitor communications over a data bus between an interface device and a second LRU, wherein the LRU is distinct from the second LRU and is distinct from the interface device;
in response to detection of a particular page being transmitted over the data bus, extract target data associated with the particular page from the data bus, wherein the particular page corresponds to a display page to be displayed via the interface device, and wherein extraction of the target data includes conversion of particular text to be displayed on the display page to a particular aircraft system control parameter; and
store the target data at a memory.

19. The computer-readable storage device of claim 18, wherein the instructions further cause the one or more processors to compare the target data to standby frequency data stored at the memory, and wherein the target data is stored at the memory responsive to the target data being distinct from the standby frequency data.

20. The computer-readable storage device of claim 18, wherein the particular page corresponds to an approach page.

* * * * *